(12) United States Patent
Jeong et al.

(10) Patent No.: US 9,733,884 B2
(45) Date of Patent: Aug. 15, 2017

(54) DISPLAY APPARATUS, CONTROL METHOD THEREOF, AND DISPLAY SYSTEM

(71) Applicant: SAMSUNG ELECTRONICS CO., LTD., Suwon-si (KR)

(72) Inventors: Jae-hoon Jeong, Suwon-si (KR); Sang-bae Park, Cheongju-si (KR); Min-hyok Bang, Anyang-si (KR); Keum-ok Lee, Suwon-si (KR); Dong-jin Lee, Suwon-si (KR); Jung-kun Lee, Seoul (KR); Kyung-sun Cho, Seoul (KR); Seong-seol Hong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 77 days.

(21) Appl. No.: 14/669,789

(22) Filed: Mar. 26, 2015

(65) Prior Publication Data

US 2015/0277843 A1   Oct. 1, 2015

(30) Foreign Application Priority Data

Mar. 26, 2014   (KR) .......................... 10-2014-0035181

(51) Int. Cl.
*G06F 3/14* (2006.01)
*G06F 3/16* (2006.01)
(Continued)

(52) U.S. Cl.
CPC .......... *G06F 3/1446* (2013.01); *G06F 3/1431* (2013.01); *G06F 3/165* (2013.01);
(Continued)

(58) Field of Classification Search
CPC ...... G06F 3/1431; G06F 3/1446; G06F 3/165; H04N 21/4122; H04N 21/41415;
(Continued)

(56) References Cited

U.S. PATENT DOCUMENTS 7,602,924 B2 * 10/2009 Kleen .................... G06F 3/165
381/124
8,395,713 B2 * 3/2013 Kondo ................ H04N 5/4403
345/1.1
(Continued)

FOREIGN PATENT DOCUMENTS

WO   2012162060 A2   11/2012

OTHER PUBLICATIONS

Communication dated Sep. 3, 2015 issued by European Patent Office in counterpart European Patent Application No. 15158316.8.
(Continued)

*Primary Examiner* — Tony Davis
(74) *Attorney, Agent, or Firm* — Sughrue Mion, PLLC

(57) ABSTRACT

A display apparatus, control method, and system are provided. The display apparatus includes a display; one or more loudspeakers; a signal processor configured to process an image signal so that an image may be displayed on the display and sound may be output from the loudspeaker; a communication interface configured to communicate with one or more external display apparatuses; and a controller configured to transmit sound processed by the signal processor to the one or more loudspeakers in accordance with a preset output designation state, determine a divided and displayed state of an image with respect to the display apparatus and the one or more external display apparatuses, and adjust the output designation state of the sound with respect to the one or more loudspeakers based on the determination.

18 Claims, 8 Drawing Sheets

(51) Int. Cl.
*H04N 5/225* (2006.01)
*H04N 21/41* (2011.01)
*H04N 21/414* (2011.01)
*H04N 21/439* (2011.01)
*H04R 5/04* (2006.01)
*H04R 27/00* (2006.01)
*H04R 5/02* (2006.01)
*H04S 7/00* (2006.01)
*H04S 3/00* (2006.01)

(52) U.S. Cl.
CPC ......... *H04N 5/225* (2013.01); *H04N 21/4122* (2013.01); *H04N 21/41415* (2013.01); *H04N 21/439* (2013.01); *H04R 5/04* (2013.01); *H04R 27/00* (2013.01); *H04R 5/02* (2013.01); *H04R 2420/03* (2013.01); *H04R 2499/15* (2013.01); *H04S 3/00* (2013.01); *H04S 7/303* (2013.01); *H04S 2400/05* (2013.01)

(58) Field of Classification Search
CPC ...... H04N 21/439; H04N 5/225; H04N 21/43; H04R 2420/03; H04R 2499/15; H04R 27/00; H04R 5/02; H04R 5/04; H04S 2400/05; H04S 3/00; H04S 7/303
USPC .................................................. 381/62, 182
See application file for complete search history.

(56) References Cited

U.S. PATENT DOCUMENTS

| | | | |
|---|---|---|---|
| 2004/0096074 | A1 | 5/2004 | Bontempi et al. |
| 2008/0165992 | A1* | 7/2008 | Kondo ................ H04N 7/0122 381/182 |
| 2010/0166193 | A1* | 7/2010 | Worrell ................ H04S 7/301 381/17 |
| 2011/0293122 | A1* | 12/2011 | Tani ..................... H04R 1/028 381/306 |
| 2012/0096125 | A1* | 4/2012 | Kallai ................... H03G 5/005 709/219 |
| 2012/0326945 | A1* | 12/2012 | Ellis ..................... G06F 3/1423 345/1.1 |
| 2015/0199021 | A1* | 7/2015 | Jeon .................... G06F 3/04817 345/158 |
| 2015/0215586 | A1* | 7/2015 | Lasko ................... H04N 7/183 348/143 |
| 2015/0358594 | A1* | 12/2015 | Marshall ............... G06F 3/013 345/419 |

OTHER PUBLICATIONS

Communication dated Sep. 17, 2015 issued by European Patent Office in counterpart European Patent Application No. 15158316.8.

* cited by examiner

FIG. 7

|  | IMAGE | | | SOUND | | |
|---|---|---|---|---|---|---|
|  | TV1 | TV2 | TV3 | TV1 | TV2 | TV3 |
| Mod1 | P1 | P1 | P1 | A1R,A1R | A1C,A1C | A1L,A1L |
| Mod2 | P1 | P1 | P1 | A1R,A1R | A1R,A1L | A1L,A1L |
| Mod3 | P1 | P1 | P1 | A1R,A1R | Mute | A1L,A1L |
| Mod4 | P1 | P1 | P2 | A1R,A1C | A1C,A1L | A2R,A2L |
| Mod5 | P1 | P1 | P2 | A1R,A1R | A1L,A1L | A2R,A2L |
| Mod6 | P1 | P1 | P2 | A1R,A1R | A1C,A1C | A1L,A1L |
| Mod7 | P1 | P1 | P2 | A1R,A1C | A1C,A1L | Mute |
| Mod8 | P1 | P2 | P1 | A1L,A1L | A1R,A1R | A1C,A1C |
| Mod9 | P1 | P2 | P1 | A1L,A1L | A1R,A1R | A1R,A1L |
| Mod10 | P1 | P2 | P1 | A1L,A1L | A1R,A1R | Mute |
| Mod11 | P2 | P2 | P1 | A2R,A2L | A1R,A1C | A1C,A1L |
| Mod12 | P2 | P2 | P1 | A2R,A2L | A1R,A1R | A1L,A1L |
| Mod13 | P2 | P2 | P1 | A1L,A1L | A1R,A1R | A1C,A1C |
| Mod14 | P2 | P2 | P1 | Mute | A1R,A1C | A1C,A1L |
| Mod15 | P1 | P2 | P3 | A1R,A1L | A2R,A2L | A3R,A3L |
| Mod16 | P1 | P2 | P3 | A2R,A2R | A2C,A2C | A2L,A2L |
| Mod17 | P1 | P2 | P3 | Mute | A2R,A2L | Mute |
| Mod18 | P1 | P2 | P3 | A2R,A2C | A2C,A2R | Mute |
| Mod19 | P1 | P2 | P3 | Mute | A2R,A2C | A2C,A2R |
| Mod20 | P1 | P2 | P3 | A2R,A2C | A2C,A2R | A3C,A3R |
| Mod21 | P1 | P2 | P3 | A1C,A1R | A2R,A2C | A2C,A2R |

DISPLAY APPARATUS, CONTROL METHOD THEREOF, AND DISPLAY SYSTEM

CROSS-REFERENCE TO RELATED APPLICATION(S)

This application claims priority from Korean Patent Application No. 10-2014-0035181, filed on Mar. 26, 2014 in the Korean Intellectual Property Office, the entire disclosure of which is incorporated herein by reference.

BACKGROUND

Field

Apparatuses and methods consistent with exemplary embodiments relate to a display apparatus capable of processing a received image signal and displaying it as an image, a control method thereof, and a display system including a plurality of display apparatuses, and more particularly to a display apparatus, method, and system, which include an improved structure for outputting sound corresponding to an image through a loudspeaker installed at respective display apparatuses when the corresponding image is displayed.

Description of the Related Art

A display apparatus may process an image signal/image data received from an outside source and/or stored therein through various processes and display it on a display panel or screen, for example, included in a television (TV), a monitor, a portable media player, a mobile phone, a tablet, and the like.

In an environment such as a public or outdoor place where users view an image from a distance, a large-sized screen may be used. To this end, a display apparatus that has a large panel may be used. However, it may be difficult to generate a single screen that is large enough for convenient viewing with one panel because of technology, costs, environment, and the like. In this case, a plurality of display apparatuses, for example a multi-panel display, may be arranged in various forms to constitute a display system. As a non-limiting example, a video wall may be used in which a plurality of display apparatuses are arranged in various forms to display an image.

If general monitors are used as the plurality of display apparatuses for the display system, each display apparatus may be not individually provided with a loudspeaker for outputting sound. However, if a television is used as the display apparatus, each display apparatus may individually include at least one loudspeaker. If the display apparatuses having the loudspeaker constitute the display system, a user may not recognize the sound output from the loudspeakers of the respective display apparatuses in accordance with various modes of displaying images on the respective display apparatuses. Therefore, it is difficult for a display system for controlling the sound output from the loudspeaker according to the respective display apparatuses so that a user can easily recognize the sound corresponding to the image.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

According to an aspect of an exemplary embodiment, there is provided a display apparatus including a display; one or more loudspeakers; a signal processor configured to process an image signal so that an image can be displayed on the display and sound can be output from the loudspeaker; a communication interface configured to communicate with one or more external display apparatuses; and a controller configured to transmit sound processed by the signal processor to the one or more loudspeakers in accordance with a preset output designation state, determine a divided and displayed state of an image with respect to the display apparatus and the one or more external display apparatuses, and adjust the output designation state of the sound with respect to the one or more loudspeakers based on the determination.

The divided and displayed state of the image with respect to the display apparatus and the one or more external display apparatuses may include a divisional region state of an image frame corresponding to one or more image signals, and a display state of the display apparatus and the one or more external display apparatuses with respect to the respective divisional regions.

The output designation state may be set up by dividing the sound according to channels, and designating which one from among the one or more loudspeakers the sound corresponding to the channel is to be transmitted to.

The display apparatus may further include a storage configured to store one or more image display modes that show the divided and displayed state of the image with respect to the display apparatus and the one or more external display apparatuses, and information about the output designation state of the sound corresponding to each image display mode, wherein the controller may search information about the output designation state of the sound corresponding to the determination result from the storage, and adjust the output designation state of the sound based on the searched information.

The controller may control the display to display a user interface (UI) that allows a user to select one from among the plurality of output designation states of the sound, in response to information about the plurality of output designation states of the sound being searched corresponding to one image display mode.

In response to the information about the plurality of output designation states of the sound corresponding to the one image display mode being stored in the storage, the plurality of output designation states of the sound may be previously prioritized, and the controller may select one output designation state of the sound in accordance with the preset priority in response to the information about the output designation state of the sound corresponding to the one image display mode being searched in the storage.

The display apparatus may further include a camera configured to photograph a user, and the controller may determine a user's interest in the display apparatus and the one or more external display apparatus based on an image photographed by the camera in response to the information about the output designation state of the sound corresponding to the one image display mode being searched for in the storage, and may select one output designation state of the sound based on the determined interest.

The controller may determine a gaze of a user's eyes through eye-tracking by the camera or analyze a user's pose within the photographed image so as to determine the user's interest.

According to an aspect of another exemplary embodiment, there is provided a method of controlling a display apparatus including a display and one or more loudspeakers, the method including communicating with one or more external display apparatuses; displaying an image on the display, and outputting a sound corresponding to the displayed image to the one or more loudspeakers in accordance with preset output designation states; determining a divided and displayed state of an image with respect to the display apparatus and the one or more external display apparatuses; and adjusting the output designation state of the sound with regard to the one or more loudspeakers based on the determination.

The divided and displayed state of the image with respect to the display apparatus and the one or more external display apparatuses may include a divisional region state of an image frame corresponding to one or more image signals, and a display state of the display apparatus and the one or more external display apparatuses with respect to the respective divisional regions.

The output designation state may be set up by dividing the sound according to channels, and designating which one among the one or more loudspeakers that the sound corresponding to the channel is to be transmitted to.

The method may further include storing one or more image display modes that show the divided and displayed state of the image with respect to the display apparatus and the one or more external display apparatuses, and information about the output designation state of the sound corresponding to each image display mode, wherein the adjusting the output designation state of the sound may include: searching information about the output designation state of the sound corresponding to the determination result from the previously stored information, and adjusting the output designation state of the sound based on the searched information.

The adjusting of the output designation state of the sound based on the searched information may include displaying a user interface (UI) allowing a that allows user to select one from among the plurality of output designation states of the sound in response to information about the plurality of output designation states of the sound being searched corresponding to one image display mode.

In response to the information about the plurality of output designation states of the sound corresponding to the one image display mode being stored in the storage, the plurality of output designation states of the sound may be previously prioritized, and the adjusting the output designation state of the sound based on the searched information may include selecting one output designation state of the sound in accordance with the preset priority in response to the information about the output designation state of the sound corresponding to the one image display mode being searched.

The method may further include preparing a camera configured to photograph a user, and the adjusting the output designation state of the sound based on the searched information may include determining a user's interest in the display apparatus and the one or more external display apparatuses based on an image photographed by the camera in response to the information about the output designation state of the sound corresponding to the one image display mode being searched; and selecting one output designation state of the sound based on the determined interest.

The determining a user's interest may include determining a gaze of a user's eyes through eye-tracking by the camera or analyzing a user's pose within the photographed image so as to determine the user's interest.

According to an aspect of another exemplary embodiment, there is provided a display system including a plurality of display apparatuses configured to display an image; a host apparatus configured to control the plurality of display apparatuses to respectively display an image corresponding to one or more image signals, where the host apparatus includes a communication interface configured to communicate with the plurality of display apparatuses; a controller configured to transmit a sound to loudspeakers of the plurality of display apparatuses in accordance with a preset output designation state so that the sound can be output corresponding to an image displayed on the respective display apparatuses, determine a divided and displayed state of one or more images with respect to the plurality of display apparatuses, and adjust the output designation state of the sound with regard to the respective loudspeakers of the plurality of display apparatuses based on the determination.

BRIEF DESCRIPTION OF THE DRAWINGS

The above and/or other aspects will become apparent and more readily appreciated by describing certain exemplary embodiments with reference to the accompanying drawings, in which:

FIG. 7 is a diagram of a database of a sound output profile to be referred to by the host apparatus in the display system of FIG. 1, according to an exemplary embodiment.

DETAILED DESCRIPTION

The exemplary embodiments are described herein in greater detail with reference to accompanying drawings. In the following exemplary embodiments, only elements directly related to the exemplary embodiment may be described, and descriptions about the other elements may be omitted. However, it should be appreciated that the elements, the descriptions of which are omitted, may not be unnecessary to the apparatus or system according to one or more of the exemplary embodiments.

Figure 1:
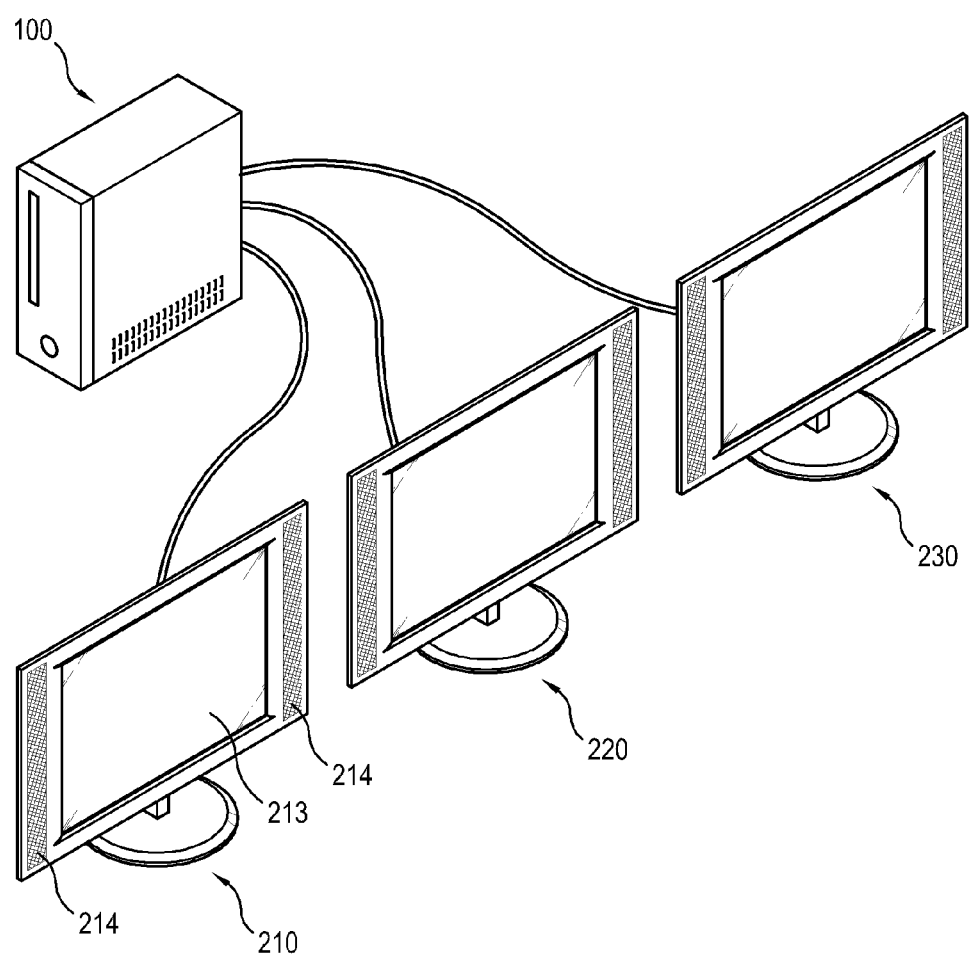
FIG. 1 is a diagram illustrating a display system according to an exemplary embodiment.

FIG. 1 is a diagram of a display system 1 according to an exemplary embodiment.

As shown in FIG. 1, the display system 1 in this example includes a plurality of display apparatuses 210, 220 and 230, and a host apparatus 100 for providing an image signal to each of the display apparatuses 210, 220 and 230 by a wire/wirelessly. The display system 1 is not limited to this exemplary embodiment but may be achieved by various apparatuses. As another example, one of the plurality of display apparatuses 210, 220 and 230 may serve as a host apparatus instead of including the host apparatus 100.

According to one or more exemplary embodiments, the plurality of display apparatuses 210, 220 and 230 may constitute a video-wall. There may be many modes of displaying a predetermined image on a large screen. For example, one display apparatus may have a panel for a large-sized screen for displaying an image. However, in this case, it may be difficult to display a screen larger than a panel size. Further, as the panel becomes larger, a delay may occur while displaying an image on the panel.

The video-wall refers to a system that has a structure in which an image is displayed by not one display apparatus but by the plurality of display apparatuses 210, 220 and 230. For example, one image frame may be divided into regions corresponding to the plurality of display apparatuses 210, 220 and 230, and each of the display apparatuses 210, 220 and 230 may individually display the divided region of the image frame. Thus, the display system 1 can display one image frame on a large screen including multiple display panels.

In this example, the plurality of display apparatuses 210, 220 and 230 are arranged in parallel with one another along a wall or while standing on the ground, thereby making a large screen. If the display apparatuses 210, 220 and 230 have a curved surface instead of a flat surface, the plurality of display apparatuses 210, 220 and 230 may be arranged to have a predetermined curvature. For example, the three display apparatuses 210, 220 and 230 may be of the same model and may be arranged in the form of a 1×3 matrix, but this is merely an example. Thus, the number and arrangement of display apparatuses 210, 220 and 230 may be changed variously, without limiting the present disclosure.

The host apparatus 100 outputs an image signal to the plurality of display apparatuses 210, 220 and 230 arranged in the form of the 1×3 matrix, thereby controlling an image display state of the respective display apparatuses 210, 220 and 230. Here, the host apparatus 100 may control the image display state of the respective display apparatuses 210, 220 and 230 through various methods, examples of which are described later.

In this embodiment, each of the display apparatuses 210, 220 and 230 is a TV. On the contrary to a general monitor, the display apparatuses 210, 220 and 230 which correspond to TVs include a loudspeaker 214. In accordance with the models of the display apparatuses 210, 220 and 230, the loudspeaker 214 may be installed in each of the corresponding display apparatuses 210, 220 and 230 at various positions and with various forms. For example, if stereo channels are supported, the loudspeakers 214 may be installed at both left and right sides of a display panel 213. As another example, if five channels are supported, the loudspeakers 214 may be installed at left upper, left lower, right upper, right lower and central lower sides of the display panel 213. For convenience of description, the display apparatuses 210, 220 and 230 will be described with a structure that the loud speakers 214 are installed corresponding to the stereo channels at both the left and right sides of the display panel 213. However, this is merely an example without limiting the present disclosure.

A mode of displaying an image in the plurality of display apparatuses 210, 220 and 230 may be set up variously. However, due to the positions of the loudspeakers installed in the respective display apparatuses 210, 220 and 230, it may be difficult for a user to recognize or hear a sound output corresponding to a relevant displayed image in accordance with the modes of displaying the image in each of the display apparatuses 210, 220 and 230.

Figure 2:
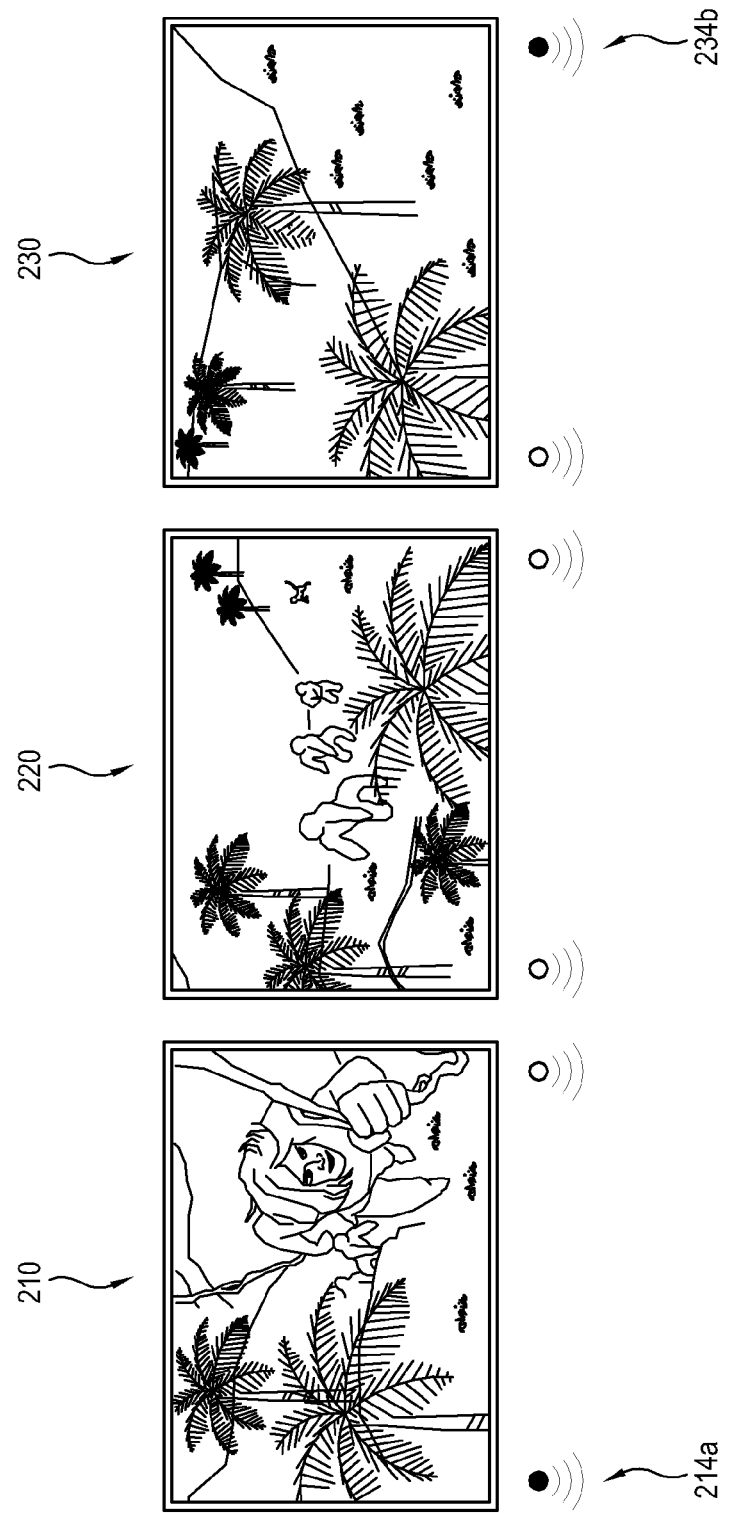
FIGS. 2 to 4 are diagrams illustrating display modes for images displayed on a plurality of display apparatuses in the display system of FIG. 1, according to exemplary embodiments.
Figure 3:
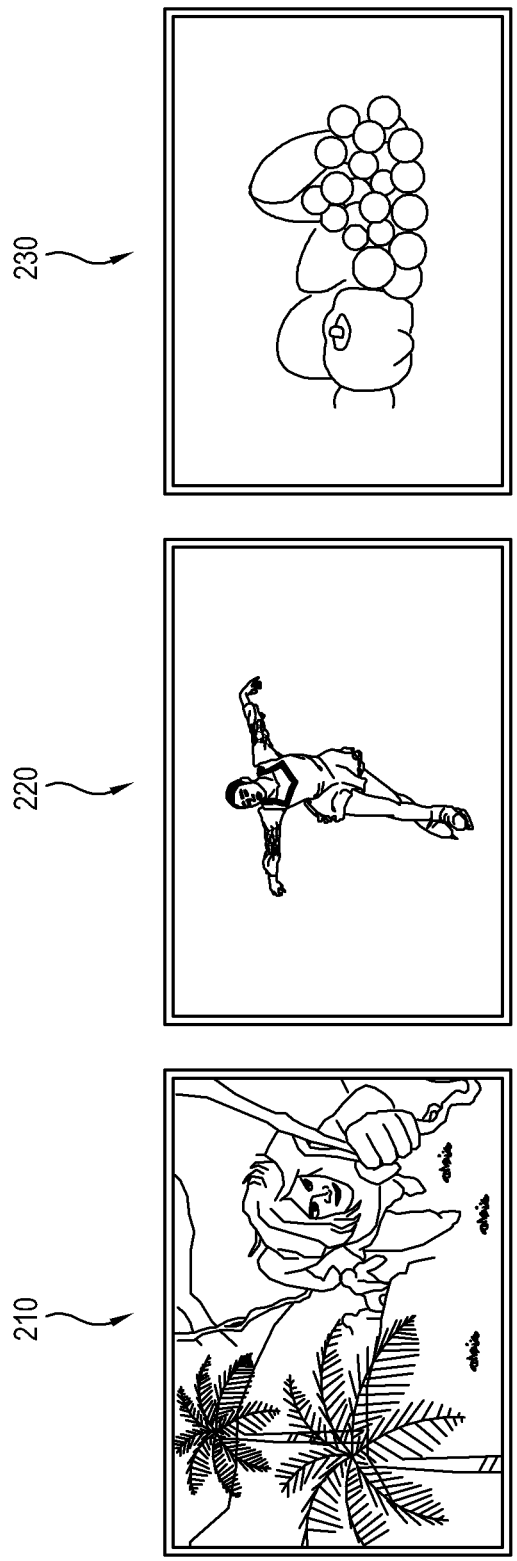
Figure 4:
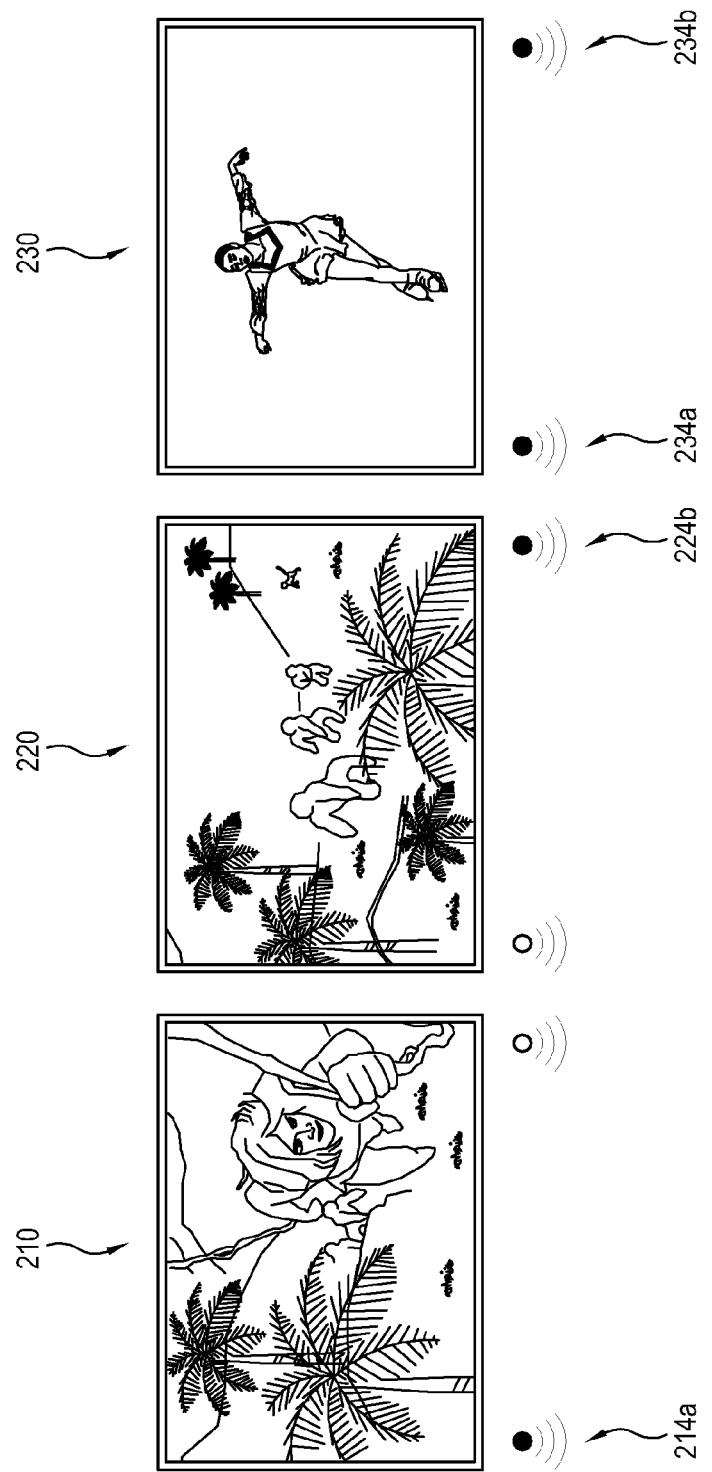

FIGS. 2 to 4 are diagrams illustrating display modes for images displayed on the plurality of display apparatuses 210, 220 and 230, according to exemplary embodiments. In these example, the left display apparatus 210 will be referred to as a first display apparatus 210, the central display apparatus 220 will be referred to as a second display apparatus, and the right display apparatus will be referred to as a third display apparatus 230.

In FIG. 2, one image frame is divided and respectively displayed by the first display apparatus 210, the second display apparatus 220 and the third display apparatus 230. In this example, one image frame is divided into three equal regions corresponding to the display apparatuses 210, 220 and 230. The three equal regions divided from the image frame are displayed in the display apparatuses 210, 220 and 230, thereby generally displaying one large image frame using the plurality of display apparatuses 210, 220 and 230.

In FIG. 3, the first display apparatus 210, the second display apparatus 220 and the third display apparatus 230 individually display image frames based on different image signals, respectively, instead of one larger image frame as in the example of FIG. 2.

In FIG. 4, the first display apparatus 210 and the second display apparatus 220 display an image frame based on a first image signal, and the third display apparatus 230 displays an image frame based on a second image signal that is different from the first image signal. In this example, the first and second display apparatuses 210 and 220 are both used to display a larger image, whereas the third display apparatus 230 displays a separate image. In addition to the examples shown in FIGS. 2 to 4, it should be appreciated that there are various modes of displaying an image in the respective display apparatuses 210, 220 and 230, and the examples are not limited hereto.

Thus, the host apparatus 100 may control the plurality of display apparatuses 210, 220 and 230 to display the image in accordance with various image display modes. In this example, the image display methods according to the respective display apparatuses 210, 220 and 230, or the image display modes according to the respective display apparatuses 210, 220 and 230, refer to divided and displayed states of an image frame based on a predetermined image signal according to the regions of the plurality of display apparatuses 210, 220 and 230.

In this example, a change in the image display mode for the display apparatuses 210, 220 and 230 may be controlled by a user through the host apparatus 100. For example, a user may issue a command for changing the image display mode for the plurality of display apparatuses 210, 220 and 230 within the display system 1 through various inputs such as a remote controller, a touch pad, a keyboard, a camera, a microphone, and the like that may be provided in or attached to the host apparatus 100 or the display apparatuses 210, 220 and 230. For example, in a state in which the three display apparatuses 210, 220 and 230 are designated to display an image frame corresponding to one image signal as shown in FIG. 2, a user may issue a command for the first display apparatus 210 and the second display apparatus 220 to display an image frame corresponding to one image signal and for the third display apparatus 230 to display an image frame corresponding to another image signal as shown in FIG. 4.

However, if the image display mode of the display system 1 is changed, a condition for outputting a sound with regard to an image may also be changed. For example, as shown in FIG. 2, if the image frame based on one image signal is divided and displayed through the plurality of display apparatuses 210, 220 and 230, sound may be output from only the left and right sides of the entire image frame. In this case, in consideration of a human's space sense, it may be easy for a user to recognize the sound when the sound is output from a left loudspeaker 214a of the first display apparatus 210 and a right loudspeaker 234b of the third display apparatus 230.

In the example of FIG. 4, the first display apparatus 210 and the second display apparatus 220 display the image frame based on the first image signal, and the third display apparatus 230 displays the image frame based on the second image signal that is different from the first image signal. In this example, the sound of the first image signal may be output through the left loudspeaker 214a of the first display apparatus 210 and a right loudspeaker 224b of the second display apparatus 220, and the sound of the second image signal may be output through a left loudspeaker 234a and a right loudspeaker 234b of the third display apparatus 230. Accordingly, a user may recognize the sound of each image signal.

Of course, it should be appreciated that there may be various modes for outputting the sound to be recognized by a user, without limiting the scope of the exemplary embodiments. It should also be appreciated that a change in the image display mode of the whole display system 1 refers to change in a display condition of a reference image when a human recognizes a sound. Therefore, the mode of outputting the sound has to be changed to correspond to the changed image display mode so that a user can clearly recognize the sound.

Thus, for example, the host apparatus 100 operates the plurality of display apparatuses 210, 220 and 230 in accordance with one being designated from among a plurality of image display modes for the state of dividing and displaying the image frames corresponding to one or more image signals. In this example, the host apparatus 100 determines each current image display mode of the display apparatuses 210, 220 and 230, and controls the output designation state of the loudspeaker according to the respective display mode of the display apparatuses 210, 220 and 230 with regard to the sound corresponding to one or more image signals based on determination results.

Thus, the display system 1 allows a user to recognize the sound in accordance with a change in the image display mode of the plurality of display apparatuses 210, 220 and 230.

Examples of the host apparatus 100 and the display apparatus 210, 220 or 230 are described with reference to FIG. 5. Here, only the first display apparatus 210 among the display apparatuses 210, 220 and 230 of FIG. 1 is described as a representative example of the display apparatus, and may be equally applied to the configurations of the other display apparatuses 220 and 230.

Figure 5:
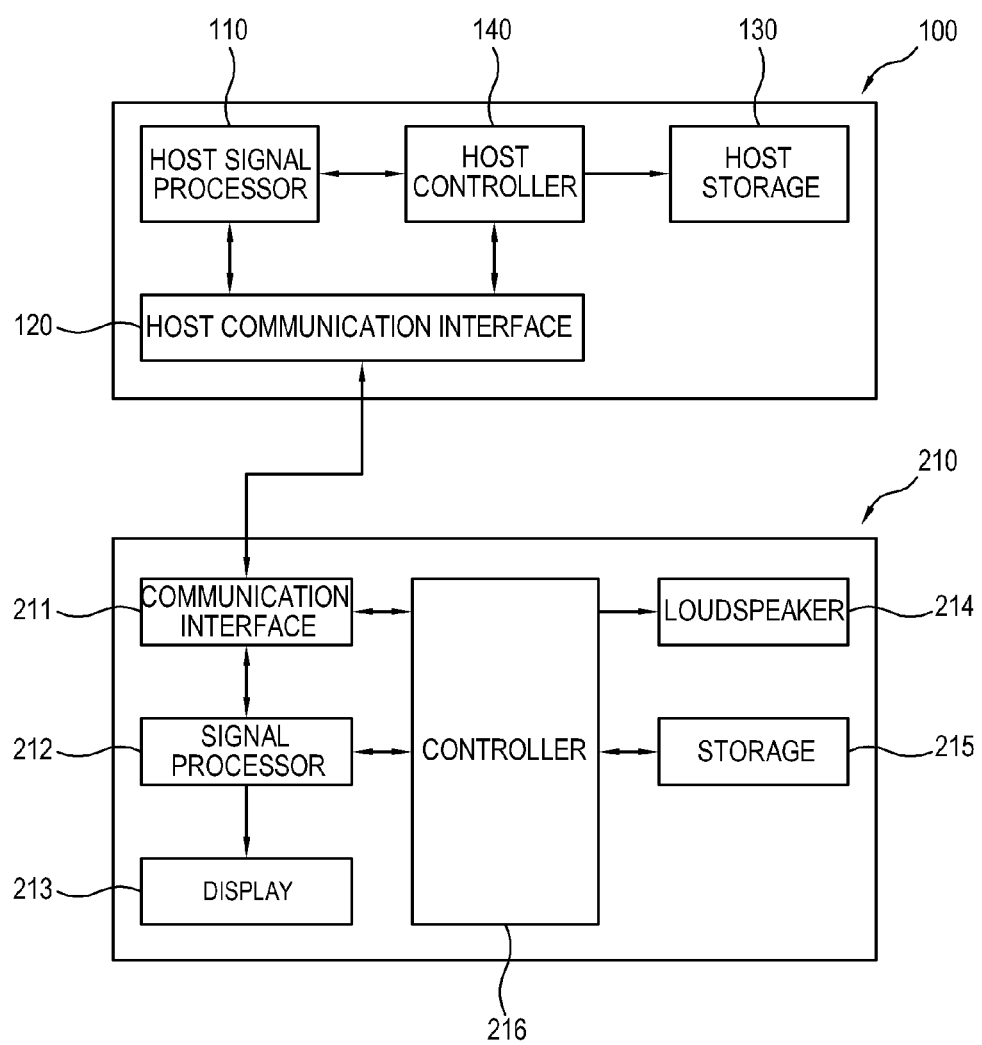
FIG. 5 is a block diagram illustrating elements of the display system of FIG. 1, according to an exemplary embodiment.

FIG. 5 is a block diagram illustrating some elements of the display system of FIG. 1, according to an exemplary embodiment.

As shown in FIG. 5, the host apparatus 100 includes a host signal processor (i.e., a host processor) 100 for processing an image signal, a host communication interface 120 for outputting an image signal processed by the host signal processor 110, a host storage 130 for storing data/information, and a host controller 140 for controlling operations of the host apparatus 100.

The host signal processor 110 may process an image signal previously stored in the host storage 130 or received from the outside through the host communication interface 120. There is no limit to the kinds of image processing processes that can be performed by the host signal processor 110. For example, the image processing may include de-multiplexing for dividing a predetermined signal into signals according to characteristics, decoding for a video format of an image signal, de-interlacing for converting an image signal from an interlace type into a progressive type, scaling for adjusting an image signal to a preset resolution, noise reduction for improving quality of an image, detail enhancement, frame refresh rate conversion, and the like.

The host signal processor 110 may be an image processing board where a chipset, a memory, an electronic component, a wiring line, and the like circuit configurations for performing such processes are mounted on a printed circuit board.

The host communication interface 120 may perform interactive communication with the outside in accordance with various wired/wireless communication protocols. The host communication interface 120 may transmit a signal received from the outside to the host signal processor 110 or the host controller 140, and transmit a signal processed by the host signal processor 110 or the host controller 140 to the outside. For example, the host communication interface 120 may transmit an image signal processed by the host signal processor 110 to the display apparatus 210.

The host storage 130 may include a flash-memory, a hard-disc drive, and the like, to store various data and information. The host storage 130 is accessed by the host controller 140, and thus, may apply reading, recording, modifying, deleting, updating, and the like, to the data.

The host controller 140 includes a central processing unit (CPU), and may control the general operations of the host apparatus 100. For example, the host controller 140 may control the host signal processor 110 to process an image signal, the host communication interface 120 to output the image signal, and the like, based on setup information previously stored in the host storage 130 or various pieces of feedback information.

In this example, the display apparatus 210 includes a communication interface 211 for receiving an image signal output from the host apparatus 100, a signal processor 212 for processing an image signal received by the communication interface 211, a display 213 for displaying an image signal that is to be processed by the signal processor 212 as an image, a loudspeaker 214 for outputting sound processed by the signal processor 212, a storage 215 for storing data/information, and a controller 216 for controlling operations of the display apparatus 210.

In this exemplary embodiment, the display apparatus 210 may display an image signal that is output from the host apparatus 100. In addition to the display 213, the display apparatus 210 may also include one or more of the elements included in the host apparatus 100. As another example, the host apparatus 100 may also include a display.

The communication interface 211 receives the image signal output from the host apparatus 100 in accordance with wired/wireless communication protocols, and transmits the received signal to the signal processor 212. Also, the communication interface 211 may transmit information about various events that are generated in the display apparatus 210, to the host apparatus 100.

The signal processor 212 processes the image signal received from the communication interface 211 by an image processing process, and outputs it to the display 213. The signal processor 212 may process the image signal in consideration of the image processing process executed by the host signal processor 110. For example, if the host apparatus 100 outputs a decoded image signal, the signal processor 212 may perform a scaling process with regard to the corresponding image signal and output it to the display 213.

The display 213 displays an image based on the image signal output from the signal processor 212. The display 213 may include various display types such as liquid crystal, plasma, a light-emitting diode, an organic light-emitting diode, a surface-conduction electron-emitter, a carbon nanotube, nano-crystal, and the like.

The display 213 may include additional elements in accordance with its types. For example, if the display 213 is achieved by a display panel of a liquid crystal type, the display 213 may include a backlight unit for emitting light to the panel, and a panel driving substrate for driving the panel.

The loudspeaker 214 outputs a sound corresponding to an image displayed on the display 213. For example, the loudspeaker 214 may include a plurality of unit loudspeakers corresponding to preset channels. In this embodiment, the loudspeaker 214 may correspond to stereo channels, but may be provided to correspond to more channels than the stereo channels.

The storage 215 may include a nonvolatile memory such as a flash memory, a hard disk drive, and the like, and may store various pieces of data and information. The storage 215 is accessed by the controller 216 and performs reading, recording, modifying, deleting, updating, and the like, with regard to data.

The controller 216 includes a CPU, and may control the general operations of the display apparatus 210. In this embodiment, the controller 216 controls operations of the signal processor 212 so that the image signal can be processed in accordance with information provided by the host apparatus 100. For example, in response to receiving processing information about which area is to undergo scaling within the whole image frame, from the host apparatus 100, the controller 216 may control the signal processor 212 to perform the scaling to the image signal based on the corresponding processing information.

As a non-limiting example, the host apparatus 100 according to one or more exemplary embodiments may operate as follows.

Figure 6:
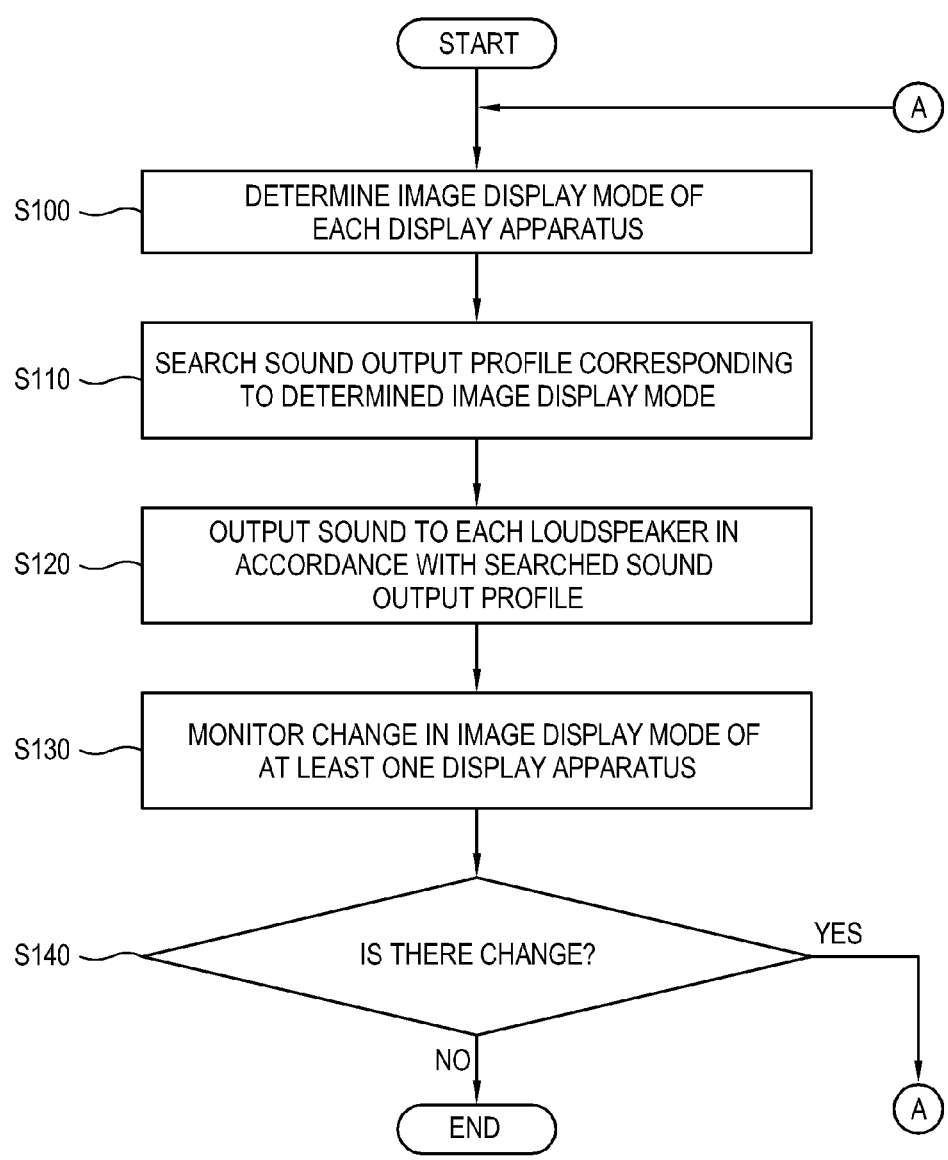
FIG. 6 is a flowchart illustrating a control method of a host apparatus in the display system of FIG. 1, according to an exemplary embodiment.

FIG. 6 is a flowchart illustrating a control method of the host apparatus 100 according to an exemplary embodiment. In this example, main operations are performed by the host apparatus 100, but embodiments are not limited thereto. Alternatively, instead of the host apparatus 100, one among the plurality of display apparatuses 210, 220 and 230 may be a principal agent of the main operations (i.e. the host apparatus). That is, operations within the display system 1 may be performed by one or more devices of the display system 1.

As shown in FIG. 6, the host apparatus 100 determines the current image display mode for the respective display apparatuses 210, 220 and 230 in operation S100, that is, the current image display mode in the display system 1.

The image display mode for the display apparatuses 210, 220 and 230 shows the divided and displayed states of the image frame corresponding to the image signal displayed in the corresponding display apparatuses 210, 220 and 230. The image display modes for the display system 1 refer to examples in which the images are displayed in the respective display apparatuses 210, 220 and 230 within the display system 1, and therefore have the same meaning as the current display modes for the display apparatuses 210, 220 and 230.

For example, the image displayed on the display apparatuses 210, 220 and 230 may be divided and partially displayed on various display apparatuses of the display system 1, or may be an image that is solely displayed on the corresponding display apparatuses 210, 220 and 230. As an example, a relative position of the first image displayed on the display apparatuses 210, 220 and 230 with respect to the second image displayed on the other display apparatuses may be determined 210, 220 and 230 in accordance with which area the first image is displayed with respect to the whole display.

The image display mode includes such information, thereby illustrating what states the images that are currently displayed on the respective display apparatuses 210, 220 and 230 are displaying.

Here, the host apparatus 100 may use various methods designated for determining the image display mode in the display system 1, or the image display modes of the respective display apparatuses 210, 220 and 230. For example, such an image display mode may be set up by a user, and therefore the image display mode may be determined based on a control signal in response to the corresponding control signal for changing the image display mode being received by a user's input.

At operation S110, the host apparatus 100 searches a sound output profile corresponding to the current image display mode for the respective display apparatuses 210, 220 and 230. For example, the sound output profile may define a state in which a target to which the sound of the image signal is output is designated according to the sound channels with respect to the loudspeakers that are respectively installed in the display apparatuses 210, 220 and 230. The sound output profile may be defined corresponding to various image display modes, and constructed as a database or a look-up table. The example, database may be previously stored in the host apparatus 100 or the display apparatuses 210, 220 and 230.

At operation S120, the host apparatus 100 outputs the sounds corresponding to the channels with respect to the respective loudspeakers in accordance with the searched sound output profiles.

At operation S130, the host apparatus 100 monitors a change in the image display mode for at least one of the display apparatuses 210, 220 and 230. Also, the host apparatus 100 monitors a change in the image display mode of the display system 1.

At operation S140, the host apparatus 100 determines whether there is change in the image display mode for at least one of display apparatuses 210, 220 and 230, based on the monitoring. If there is no change, the host apparatus 100 maintains the current sound output state. On the other hand, if there is change, the host apparatus 100 may perform the processes from the foregoing operation S100, and thus, adjust the sound output state to correspond to the changed image display mode.

For example, the host apparatus 100 may adjust the sound output of the loudspeakers designated corresponding to the channels according to the respective display apparatuses 210, 220 and 230, based on the current image display modes for the respective display apparatuses 210, 220 and 230.

Below, an example of the database of the sound output profile is described with reference to FIG. 7.

FIG. 7 is a diagram illustrating a database of the sound output profile to be referred to by the host apparatus 100, according to an exemplary embodiment. In the display system 1, the image display modes may be variously determined depending on designs and arrangements of the plurality of display apparatuses 210, 220 and 230. Also, the channels supported by the loudspeakers of the respective display apparatuses 210, 220 and 230 may be three or more as well as the stereo channels. FIG. 7 shows just an example of the database, however, the database included in an actual product may be more complicated and may include one or more elements.

As shown in FIG. 7, the database includes image display modes showing the display states of the respective display apparatuses 210, 220 and 230, and an output designation state of the sound corresponding to each image display mode.

Referring to image items in the table of FIG. 7, TV1, TV2 and TV3 respectively indicate the three display apparatuses 210, 220 and 230. In this example, there are image display modes from Mod1 to Mod21 in accordance with what images the display apparatuses 210, 220 and 230 respectively display. Further, P1, P2 and P3 indicate images corresponding to different image signals. For example, P1 indicates a first image based on a first image signal, P2 indicates a second image based on a second image signal, and P3 indicates a third image based on a third image signal, which are displayed on the display apparatuses 210, 220 and 230.

In the example of Mod1, all of TV1, TV2 and TV3 correspond to P1, and this mode shows that the three display apparatuses 210, 220 and 230 respectively displays three equal regions of the first image (see FIG. 2). In the example of Mod4, TV1 and TV2 correspond to P1, and TV3 corresponds to P2, and this mode shows that the display apparatuses 210, 220 and 230 respectively display two equal regions of the first image, and the other one among the display apparatuses 210, 220 and 230 displays the second image (see FIG. 4). In the example of Mod15, TV1 corresponds to P1, TV corresponds to P2, and TV3 corresponds to P3, and this mode shows that the display apparatuses 210, 220 and 230 display the first, second and third images respectively different from one another (see FIG. 3).

Meanwhile, with regard to sound items, TV1, TV2 and TV3 refer to the three display apparatuses 210, 220 and 230, respectively. The output designation state of the sound corresponding to each image display mode may include two pieces of setup information according to the display apparatuses 210, 220 and 230, which show each output designation state of the right loudspeaker and the left loudspeaker.

In this example, the information about the output designation state includes A1R which indicates a right channel output of a first sound based on the first image signal, A1L which indicates a left channel output of the first sound based on the first image signal, and A1C which indicates a center channel output of the first sound based on the first image signal. Likewise, A2R, A2L and A2C respectively indicate right, left and center channel output of a second sound based on a second image signal.

The center channel may be provided if the sound corresponds to three or more channels. However, if there is no center channel due to the sound of the stereo channels, the center channel may be generated by mixing the sounds of the left and right channels, or may be muted. As another example, in the information of the output designation state, in an example in which no sound is output to the loudspeaker may be represented as 'Mute'.

If it is sensed that the image display mode is changed within the display system 1, the host apparatus 100 may determine the current image display mode based on the divided and displayed states of the images displayed on the respective display apparatuses 210, 220 and 230. For example, the state, in which TV1 and TV2 display the first image and TV3 displays the second image, may correspond to four modes Mod4, Mod5, Nod6 and Mod7.

If only one mode corresponding to one image display state is provided in the database, the sound may be output in accordance with information about the output designation state of the corresponding mode. However, if a plurality of modes corresponding to one image display state are provided in the database as disclosed in the exemplary embodiment, the host apparatus 100 may select and apply one mode in accordance with various conditions. For example, the plurality of modes may be prioritized, and the host apparatus 100 may select the mode having higher priority. Alternatively, the host apparatus 100 may display a user interface (UI) that allows a user to select one from among the plurality of modes on the display apparatuses 210, 220 and 230.

If one of the image display modes is selected in the database, the host apparatus 100 may control each loudspeaker of the display apparatuses 210, 220 and 230 to output the sound, for example, in accordance with information about the output designation state of the sound designated for the corresponding mode. For example, if Mod4 is selected, the host apparatus 100 may output a right channel of the first sound to the right speaker of TV1, a center channel of the first sound to the left loudspeaker of TV1 and the right loudspeaker of TV2, a left channel of the first sound to the left loudspeaker of TV2, a right channel of the second sound to the right loudspeaker of TV3, and a left channel of the second sound to the left loudspeaker of TV3.

As another example, if Mod17 is selected, the host apparatus 100 may output no sound to the loudspeakers of TV1 and TV3, a right channel of the second sound to the right loudspeaker of TV2, and a left channel of the second sound to the left loudspeaker of TV2.

According to one or more exemplary embodiments, the host apparatus 100 may determine the output designation state of the sound corresponding to the image display mode for the display system 1, and output the sound to the loudspeakers of the respective display apparatuses 210, 220 and 230 in accordance with the determined states. Also, if the image display mode for the display system 1 is changed, the host apparatus 100 may change the sound output state of each loudspeaker of the display apparatuses 210, 220 and 230 in accordance with the changed image display mode.

As an example, a database may be designed and previously stored when the apparatus is manufactured. Also, a UI may be provided to a user so that the user can change at least a part of record in the database.

Below, is a second exemplary embodiment that is described with reference to FIG. 8.

Figure 8:
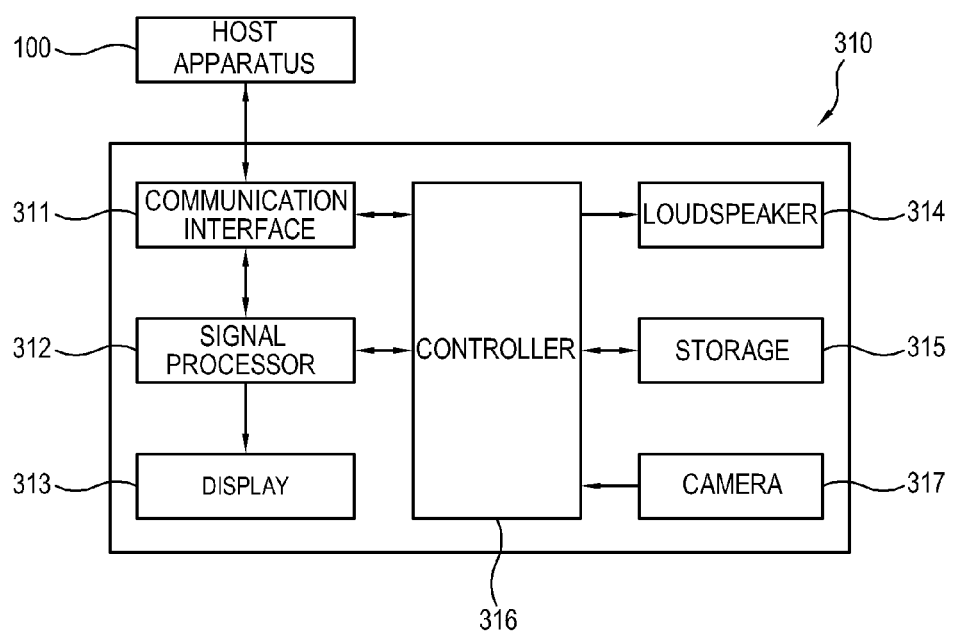
FIG. 8 is a diagram illustrating a display apparatus according to another exemplary embodiment.

FIG. 8 is a diagram illustrating a display apparatus 310 according to another exemplary embodiment.

As shown in FIG. 8, the display apparatus 310 includes a communication interface 311, a signal processor 312, a display 313, a loudspeaker 314, a storage 315, and a controller 316, examples of which are described with respect to the first exemplary embodiment of FIG. 5. Thus, repetitive descriptions are omitted.

For example, if the display apparatus 310 is a TV, the display apparatus 310 may include a camera 317 to photograph a user's figure. Also, a camera may be not installed in the display apparatus 310 but may be included as a separate device in the display system 1. In both the foregoing cases, the host apparatus 100 can receive a result photographed or sensed by the camera 317.

The camera 317 may transmit an image that is obtained by photographing a user for a predetermined period of time, to the host apparatus 100. The host apparatus 100 may analyze the image photographed by the camera 317, and determine which one of the display apparatuses 310 a user views an image displayed on, or which one of the display apparatuses 310 a user is interested in having an image displayed thereon.

If the database (see FIG. 7) includes a plurality of modes corresponding to one image display state, the host apparatus 100 may select one of the modes based on the determined interest. For example, if the current image display mode corresponds to Mod15 through Mod21, and it is determined that a user is most interested in TV2, the host apparatus 100 may select the sound output designation state of Mod17 which is designated to output only the sound of TV2.

In this example, there are many methods for determining a user's interest in the display apparatus 310 or the displayed image. For example, there is a method of sensing a gaze of a user's eyes through eye-tracking by the camera 317, a method of sensing a user's pose with regard to the camera 317, and the like.

The methods described above can be written as a computer program, a piece of code, an instruction, or some combination thereof, for independently or collectively instructing or configuring a processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

Although a few exemplary embodiments have been shown and described, it will be appreciated by those skilled in the art that changes may be made in one or more of these exemplary embodiments without departing from the principles and spirit of the invention, the scope of which is defined in the appended claims and their equivalents.

What is claimed is:

1. A display apparatus comprising:
a display configured to display a first image;
one or more loudspeakers;
a signal processor configured to process an image signal to generate the first image and sound to be output from at least one loudspeaker of one or more loudspeakers;
a communication interface configured to communicate with one or more external display apparatuses, at least one of the one or more external display apparatuses displaying a second image;
a controller configured to, in response to the second image displayed on the at least one of the one or more external display apparatuses being changed while the first image is maintained on the display, control to change a location of the at least one loudspeaker from which the sound is output; and
a storage configured to store information about one or more image display modes corresponding to states of images with regard to the display and the one or more external display apparatuses,
wherein the information about the one or more image display modes comprises information about the location of the at least one loudspeaker form which the sound is output corresponding to each image display mode, and
wherein the controller is configured to change the location of the at least one loudspeaker from which the sound is output based on the information stored in the storage.

2. The display apparatus according to claim 1, wherein the first image and the second image correspond to an image frame corresponding to one or more image with signals, the display apparatus and the at least one of the one or more external display apparatuses corresponding to a divided and a display state of the image frame.

3. The display apparatus according to claim 1, wherein the controller is configured to divide the sound according to channels, and designate a loudspeaker from among the one or more loudspeakers from which sound corresponding to a channel is output.

4. The display apparatus according to claim 1, wherein the controller is configured to control the display to display a user interface (UI) that allows a user to select one from among a plurality of output designation states of the sound, in response to information about a plurality of locations of the at least one loudspeaker from which the sound is output corresponding to one image display mode being stored in the storage.

5. The display apparatus according to claim 1, wherein, in response to the information about a plurality of locations of the at least one loudspeaker from which the sound is output corresponding to the one image display mode being stored in the storage, one of the plurality of locations is previously prioritized, and
the controller is configured to select the one of the plurality of locations, when the one image display mode is searched for in the storage.

6. The display apparatus according to claim 1, further comprising a camera configured to photograph a user,
wherein the controller is configured to determine a user's interest in the display apparatus and the one or more external display apparatus based on an image photographed by the camera in response to information about the location of the at least one loudspeaker from which the sound is output corresponding to the one image display mode being searched for in the storage, and select the location based on the determined interest.

7. The display apparatus according to claim 6, wherein the controller is configured to determine a gaze of a user's eyes through eye-tracking by the camera or analyze a user's pose within the photographed image to determine the user's interest.

8. A method of controlling a display apparatus that comprises a display and one or more loudspeakers, the method comprising:
displaying a first image on the display and outputting sound from at least one loudspeaker of the one or more loudspeakers;
communicating with one or more external display apparatuses, at least one of the one or more external display apparatuses displaying a second image;

in response to the second image displayed on the at least one of the one or more external display apparatuses being changed while the first image is maintained on the display, changing a location of the at least one loudspeaker from which the sound is output; and storing information about one or more image display modes corresponding to states of images with respect to the display and the one or more external display apparatuses, wherein the information about one or more image display modes comprises information about the location of the at least one loudspeaker from which the sound is output corresponding to each image display mode, and wherein the changing comprises changing the location of the at least one loudspeaker from which the sound is output based on the information stored in the storage.

9. The method according to claim 8, wherein the first image and the second image correspond to an image frame corresponding to one or more image signals, the display apparatus and the at least one of the one or more external display apparatuses corresponding to a divided and displayed state of the image frame.

10. The method according to claim 8, wherein the changing comprises dividing the sound according to channels, and designating a loudspeaker from among the one or more loudspeakers from which sound corresponding to a channel is output.

11. The method according to claim 8, further comprising displaying a user interface (UI) that allows a user to select one from among a plurality of output designation states of the sound, in response to information about a plurality of locations of the at least one loudspeaker from which the sound is output corresponding to one image display mode being stored in the storage.

12. The method according to claim 8, wherein, in response to the information about a plurality of locations of the at least one loudspeaker from which the sound is output corresponding to the one image display mode being stored in the storage, one of the plurality of locations is previously prioritized, and the changing comprises selecting the one of the plurality of locations, when the one image display mode being searched.

13. The method according to claim 8, further comprising:

photographing, by using a camera, an image of a user;

determining a user's interest in the display apparatus and the one or more external display apparatus based on an image photographed by the camera, in response to information about the location of the at least one loudspeaker from which the sound is output corresponding to the one image display mode being searched; and selecting the location based on the determined interest.

14. The method according to claim 13, wherein the determining a user's interest comprises determining a gaze of a user's eyes through eye-tracking by the camera or analyzing a user's pose within the photographed image so as to determine the user's interest.

15. A display system comprising:

a plurality of display apparatuses; and a host apparatus configured to control the plurality of display apparatuses to respectively display an image corresponding to one or more image signals, the host apparatus controlling a first display apparatus to display a first image and a second display apparatus to display a second image, wherein the host apparatus comprises:

a communication interface configured to communicate with the plurality of display apparatuses;

a controller configured to, in response to the second image displayed on the second display apparatus being changed while the first image is maintained on the first display apparatus, change a location of one or more loudspeakers of the first display apparatus from which sound is output; and a storage configured to store information about one or more image display modes corresponding to states of images with regard to the plurality of display apparatuses, wherein the information about one or more image display modes comprises information about the location of the one or more loudspeakers from which the sound is output corresponding to each image display mode, and wherein the controller is configured to change the location of the one or more loudspeakers from which the sound is output based on the information stored in the storage.

16. A host apparatus for a multi-panel display including a plurality of display apparatuses, the host apparatus comprising:

a signal processor configured to generate a first image to be displayed on a first display of the multi-panel display and a second image to be displayed on a second display of the multi-panel display, and to generate sound to be output from at least the first display;

a controller configured to detect a change in a display state of the second image displayed on the second display while the second image is maintained on the second display, and to control the signal processor to change a location in which sound is output from the first display based on the detected change in the display state of the second image; and a storage configured to store information about one or more image display modes corresponding to states of images with regard to the plurality of display apparatuses, wherein the information about one or more image display modes comprises information about the location in which the sound is output corresponding to each image display mode, and wherein the controller is configured to change the location in which the sound is output based on the information stored in the storage.

17. The host apparatus of claim 16, wherein the host apparatus is one of the plurality of display apparatuses included in the multi-panel display.

18. The host apparatus of claim 16, wherein the controller is configured to detect an increase or a decrease in an amount of image display apparatuses of the multi-panel display that display at least one image, and control the signal processor to change the location in which sound is output from the first display accordingly.

* * * * *